United States Patent [19]

Poncy

[11] 4,165,000

[45] Aug. 21, 1979

[54] TEAR-TAB STERILE THERMOMETER SHEATH

[76] Inventor: George W. Poncy, 12540 U.S. 1, North Palm Beach, Fla. 33408

[21] Appl. No.: 550,000

[22] Filed: Feb. 14, 1975

[51] Int. Cl.² ...................... A61B 19/02; B65D 65/26
[52] U.S. Cl. .................................. 206/306; 206/601; 206/498
[58] Field of Search ............... 206/306, 212, 484, 498, 206/370, 363, 303

[56] References Cited

U.S. PATENT DOCUMENTS

| | | | |
|---|---|---|---|
| 3,086,647 | 4/1963 | Krezanoski | 206/498 |
| 3,809,228 | 5/1974 | Fowler et al. | 206/306 |
| 3,847,280 | 11/1974 | Poncy | 206/306 |

*Primary Examiner*—William T. Dixson, Jr.
*Attorney, Agent, or Firm*—Lane, Aitken & Ziems

[57] ABSTRACT

A sheath-package includes two inner sheets disposed adjacent to each other and adapted to be sealed to each other, the outer surfaces of said inner sheets being sterilizable. Two cover sheets are also provided, each of which is disposed adjacent to the outer surface of one of the inner sheets, the inner surface of each cover sheet being sterilizable and adapted to be sealed to its respective adjacent inner sheet. A sheath is formed by joining the inner sheets together along a seal line in the form of a tear seal, the portions of the inner sheets outside of the tear seal forming waste portions, the seal line terminating at two end points to define a mouth adapted for insertion of an instrument into the sheath. A tab is formed by portions of the inner and outer sheets projecting beyond the mouth, the seal line being shaped so that the waste portions connect with the portions of the inner sheets in the tab outside of the seal line. The respective adjacent inner and cover sheets are sealed together at least along the seal line and between the two end points of the seal line and at least one of the cover sheets include a weakened portion across substantially the entire width thereof near the mouth so that the cover sheet can easily be separated along the weakened portion.

13 Claims, 9 Drawing Figures

TEAR-TAB STERILE THERMOMETER SHEATH

BACKGROUND OF THE INVENTION

This invention relates to an improved sheath-package for products which are required to be sterile, including tools or instruments such as clinical thermometers, tongue depressors, probes, catheters and the like, which are used by the medical profession and other scientific personnel. While the sheath-package is adaptable for use with a variety of objects, it will be described and illustrated in connection with a clinical thermometer.

While it is well known that the thermometer used in taking temperature readings must be in a state of sterility in order to avoid recontamination of the patient in subsequent readings, or contamination of another patient, it is not as well known among laymen that present practices in hospitals or by doctors in their private practices do not afford a sterile thermometer in most instances. The cross-contamination that can occur when the same thermometer is used on different patients is a constant hazard.

The shortcomings of this practice with regard to sterility of thermometers was well recognized by the medical profession which, while cognizant of the dangers of such practice, did not have available a practical and economical means of facilitating the use of a thermometer which is sterile at each use.

The inventions of my U.S. Pat. Nos. 3,552,558; 3,732,975; 3,809,230; and 3,842,280, generally provide in a sterile expendable package a sterile disposable sheath for instruments such as clinical thermometers. The package is designed so that a thermometer can readily be inserted by anyone so that the thermometer enters directly into a transparent sheath which has previously been sterilized and maintained in a sterile condition within the package in those areas which come into contact with the body of a patient. The package can be stripped to expose the sterile sheath, whereupon the sheathed thermometer may be inserted into a body cavity, and a reading subsequently taken through the sheath. The sheath can then be discarded, or it may first be discarded, so that the reading can be taken directly from the thermometer.

The thermometer may then, for subsequent use, be inserted into a new package and sheath without the necessity of sterilizing the thermometer itself after each use. This results in a substantial saving of time in the handling of the thermometer, and in the saving of money for the materials and supplies heretofore used to sterilize such objects. The use of such a sterile package will also serve to reduce the total number of thermometers required to be available.

In one embodiment of the invention described in the patents mentioned above, a tab portion provided around the mouth of the sheath is formed of portions of the package which project beyond the mouth away from the sheath. The excess portions of the package that are stripped from the sheath prior to use of the thermometer are left attached to the tab portions at the mouth of the sheath after the sheath has been exposed. One useful purpose for leaving these excess portions attached to the tab is to twist them together and use them to remove the thermometer from the sheath after a temperature is taken rectally so that the user will not be required to touch the soiled sheath after the sheathed thermometer has been removed from the rectum. In addition, these excess portions are desirable to provide an extra amount of material to hold upon removal of the thermometer to make sure that the sheath is removed from the body orifice along with the thermometer. The excess portions are connected to the tab by terminating the flared mouth portion of the sheath short of each edge of the package so that when the excess portions of the cover material and sheath material are stripped back they are left connected to the portions of those materials forming the tab. However, it has been found that in oral insertions, a preference may exist for separation and discarding the excess portions leaving only the shorter tab portions as a grasping means to withdraw the sheath with the thermometer from the patients orifice. The remaining tab portion is sufficient in size to permit removal of the contaminated sheath without requiring manual contact with said sheath.

It has been found that the procedure of totally removing the excess portions when a tab is provided as discussed above is cumbersome because the types of material used in forming the sheath-package resist a clean severance. This results in the possibility of wasted time and the likelihood that the sheath could become contaminated because of the relatively clumsy removal procedure. In addition, even after the large part of the excess portions have been removed some of the excess thermoplastic material used to form the sheath may still remain attached to the tab and prove to be bothersome.

SUMMARY OF THE INVENTION

In accordance with the invention, these problems have been solved by providing a weakened portion in the upper cover material across substantially the entire width thereof near the mouth so that as the cover material and excess sheath material are pealed back to expose the sheath, they can easily be separated from the tab portion. Although the sheath material is not weakened the width of the connection between the excess portion of the sheath material and the portion of that material forming a tab is small enough so that the elastic nature of that sheath material will not resist a clean severance.

The weakened portion can be in the form of a perforated line in which case it should be included in the portion of the cover material where it and the sheath material are sealed or laminated together near the mouth so that the sheath will not be contaminated because of bacteria entering through the perforations. However, if the weakened portion is formed by merely scoring the cover sheath (as opposed to puncturing or perforating it) it does not necessarily have to be located in the laminated area because since scoring does not expose the sheath through the cover material no contamination will occur.

A similarily weakened portion can be provided on the lower cover material so that it can easily be separated from the tab in a manner similar to the way the top excess material is separated. However, this lower scored portion is not necessary because, as will become apparent from the detailed description below, after the top excess material has been removed the lower excess material is no longer connected to the elastic material that is used to form the sheath and can easily be removed without a weakened portion.

BRIEF DESCRIPTION OF THE DRAWINGS

For a better understanding of the invention, reference may be had to the following description of an exemplary embodiment taken in conjunction with the accompanying drawings in which.

DETAILED DESCRIPTION OF AN EXEMPLARY EMBODIMENT

Figure 1:
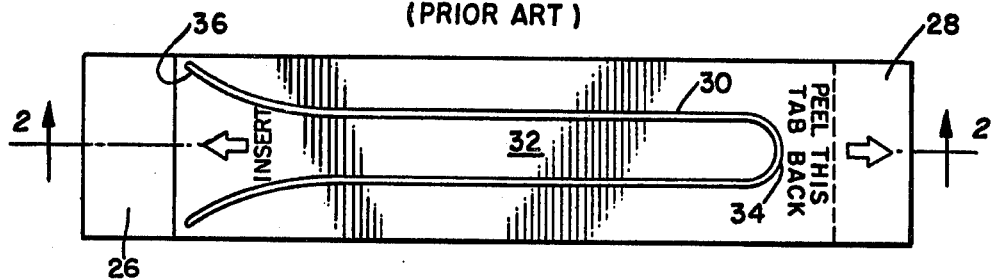
FIG. 1 is a plan view of a prior art sheath-package.
Figure 2:
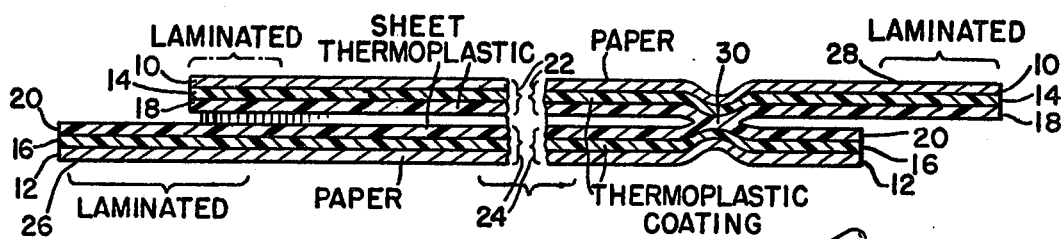
FIG. 2 is an exaggerated, central, longitudinal section view of FIG. 1, looking along the line 2—2 thereof.

In order to provide a clear understanding of the subject invention, my prior art sheath-package as shown in FIGS. 1-5 will be described briefly. As best shown in FIG. 2, the sheath-package is formed of a plurality of layers of material that are joined together by heat sealing. These layers include the outer protective strips 10, 12, respectively, which are formed of thin strips of paper, preferably glassine. Each of the outer strips 10, 12, is coated on its inner surface with a very thin layer of thermoplastic material 14, 16, to form a composite strip. The thickness of the thermoplastic coating is preferably about ½ mil or less. These composite strips taken together will hereinafter be called the cover material.

The sheath-package also includes two intermediate strips 18, 20, which are formed of thin films or sheets of an impervious, transparent, plastic material, each of which is preferably about 1 mil in thickness. As will become apparent from the following description, these strips are used to form the sheath and will be called the sheath material.

The cover material and sheath material are arranged in two strip assemblies, as shown in FIG. 2, which will be called the upper strip assembly 22 and the lower strip assembly 24. When these assemblies are formed onto the package as shown, the ends of the upper strip assembly 22 are preferably offset with respect to the ends of the lower strip assembly 24 as shown in FIG. 2 so that the tabs 26, 28 are formed at the ends of the overall sheath-package.

The tab 26 is defined as the portion of the lower strip assembly 24, that projects beyond the end of the strip assembly 22 and serves as a guide to facilitate inserting the thermometer into the sheath. The tab 28 is defined as the portion of the upper strip assembly 22 that projects beyond the end of the lower strip assembly 24 at the other end of the sheath-package and is provided so that that strip can easily be grasped and pealed back to expose the sheath.

The thermoplastic coating 14, 16, of the composite cover material is sealed or welded to the thermoplastic sheath material 18, 20, across the width of one end of each strip over the areas indicated by the term "LAMINATED" as shown in FIG. 2. These laminated portions are provided at the lefthand end as shown in FIG. 2 to prevent bacteria from entering between the laminated sheets and contaminating the sheath and at the righthand side so that the materials in the upper strip assembly 32 can easily be grasped to expose the sheath. The remaining adjacent portions of the respective cover and sheath materials may be in physical contact, but are not sealed to each other except as indicated below.

Figure 3:
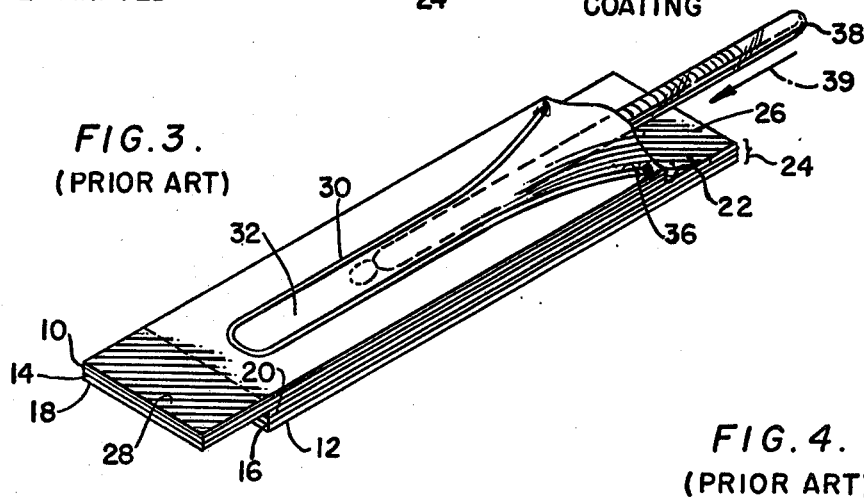
FIG. 3 is a perspective view of a prior art sheath-package with a thermometer partially inserted therein.

Reference numeral 30 in FIG. 1 is used to indicate the seal line which is where the cover and sheath materials are joined together by an electronic die in the shape of the seal line 30 in a high frequency heat sealing press. The line 30 forms the outline of the sheath 32 which is closed at one end 34 and open at the other end through a flaring or funnel-shaped mouth 36 which is adapted to receive the thermometer 38, along the direction of the arrow 39 as shown in FIG. 3. When the heat sealing die is applied to the assembly of sheath and cover materials they are all united together along the seal line 30. The sealing of the strips together along the line 30 is accomplished by the flowing together of the thermoplastic material of the coatings 14 and 16 and the strips 18 and 20. The strips 18 and 20 are bonded together along the line 30 to form a tear seal. Formation of this tear seal has the effect of weakening the thermoplastic material so that after a thermometer has been inserted in the sheath the sheath material of strips 18 and 20 outside of the line 30 will easily tear along the middle of the seal line 30 to leave the sheath 32 remaining around the thermometer.

The coated construction of the strips 10 and 12 of cover material permits them to be easily separated from the strips 18 and 20 of sheath material along the seal line 30 with the application of small force. The bond between the strips 18 and 20 along line 30 however is strong enough to prevent separation of the strips 18 and 20 along the seal 30, although as pointed out above the seal is tearable down the middle thereof to separate the sheath material outside the seal line 30 from the material inside comprising the sheath 32 itself.

Figure 4:
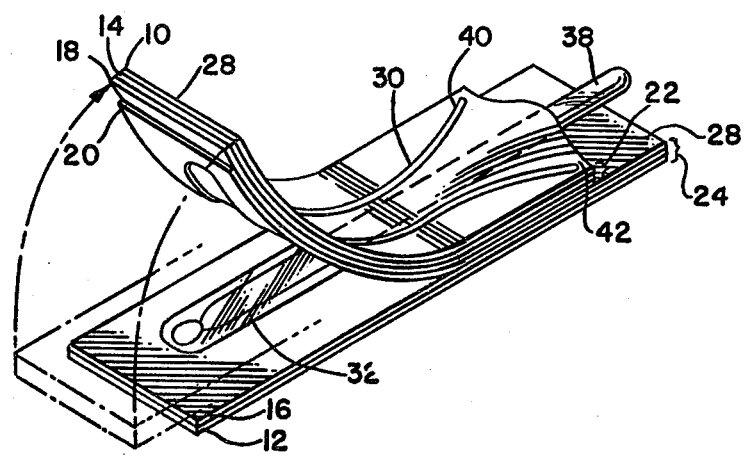
FIG. 4 is a perspective view of a sheath-package similar to that of FIG. 3, but with the upper strip partially pealed back to expose the sheath with the thermometer therein.

As shown in FIG. 3, the thermometer 38 is inserted into the mouth 36 of the sheath-package which is open to the atmosphere. The tab 28 is then grasped and pealed back as shown in FIG. 4. When this is done, the upper cover material and the excess sheath material (the sheath material outside of the line 30) in both the upper and lower strip assemblies 22, 24, is all removed at the same time. This results from the nature of the tear seal along the line 30 which causes the assembly of the strips 18 and 20 to tear along the seal line and the excess thermoplastic material of the strips 18 and 20 to be pealed back along with the cover strip 10.

Figure 5:
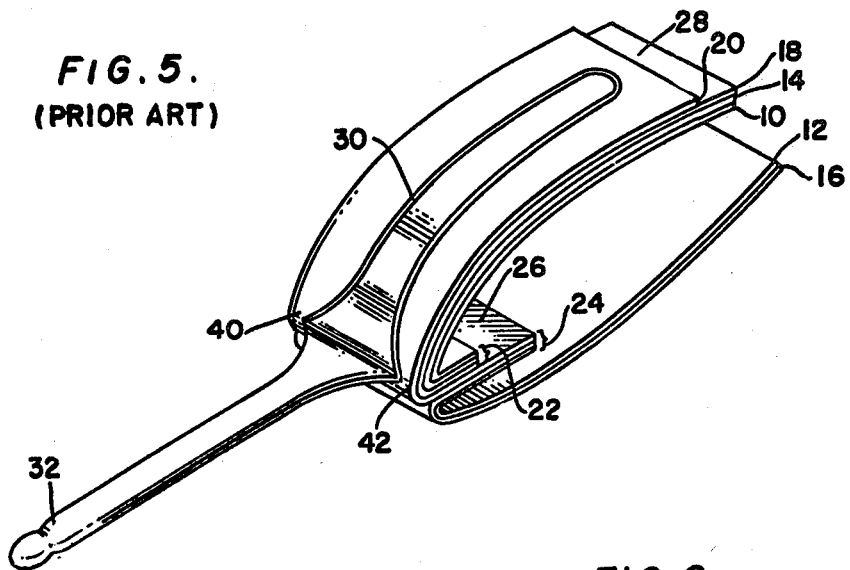
FIG. 5 is a perspective view of a prior art sheath-package with both the top and bottom portions of excess material stripped back to expose the sheath and thermometer, showing in particular the connection between the excess portions and the tab.

As shown in FIG. 5, when both the upper and lower strip assemblies 22, 24, are pealed all the way back the cover material and the excess sheath material remain connected to the tab 26 at the points 40, 42, which are formed by terminating the outer ends of the flared mouth 36 short of the edges of the sheath-package. As mentioned above, these pealed back portions can be twisted together to form an elongated tab which allows for convenient removal of the thermometer from the sheath after a rectal temperature is taken and insures that the entire sheath is removed from the body orifice. However, some users prefer to remove the pealed back portions attached to the upper tab 26 and attempt to separate the pealed back portion from the tab 26. Because of the connections 40, 42, such separation is difficult to achieve because the paper layers 10, 12, do not tear uniformly and the thermoplastic material tends to stretch causing a non-uniform tear and leaving bothersome strings of thermoplastic material that should be removed.

Figure 6:
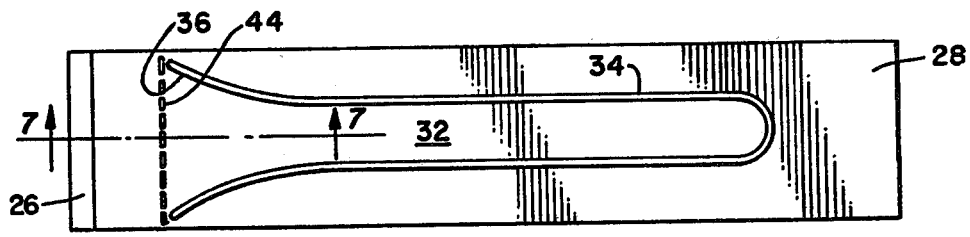
FIG. 6 is a plan view of the inventive sheath-package, showing in particular the weakened portion near the mouth of the sheath.
Figure 7:
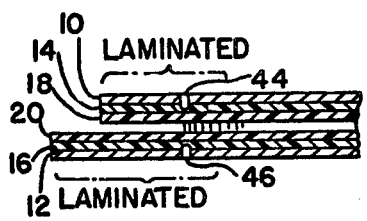
FIGS. 7 and 8 are exaggerated, central, longitudinal sectional views of FIG. 6 showing several constructions of the weakened portion.
Figure 8:
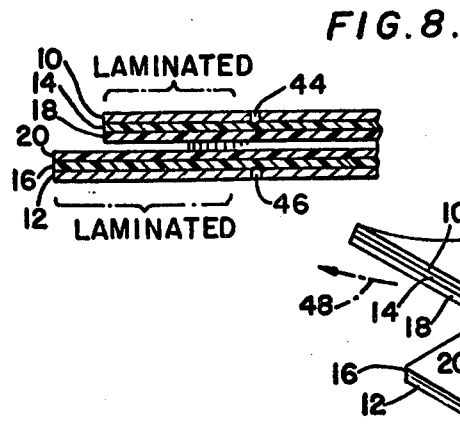

These problems are solved by providing the sheath-package shown in FIGS. 6–8, wherein a package formed similar to the one described above is provided with a weakened portion 44 along the width of the upper lay 10 at or near the mouth 36. The weakened portion could be formed by providing a series of perforations or punctures in the upper cover material layer, in which case the weakened portion 44 must be located in a section of the upper strip 22 where the inner coating 14 has been laminated to the layer of thermoplastic sheath material 18. This is to prevent contamination of the outer surface of the sheath. Alternatively, the weakened portion could be formed by scoring or otherwise weakening the fibers of the paper strip 10 along the line 44.

As shown in FIG. 8 the weakened portion may be located outside the laminated area provided that the cover material is scored or perforated in such a way as not to penetrate the thermoplastic coating 14 on the inner surface of the upper strip 10.

The bottom cover sheath may also include a weakened portion 46 as shown in FIGS. 7 and 8. However, this lower weakened portion is not necessary to the invention since both the upper and lower strips of excess sheath material are pealed off along with the upper cover layer as discussed above and when the lower cover material is pealed away it can simply be pulled back and separated from the tab 26 without the resulting stretching of thermoplastic sheath material. In addition the edges of the seal line defining the mouth of the sheath are made to end very near to the edge of the strips so as to provide a narrow width of thermoplastic material between the ends of the mouth and the edges of the thermoplastic material. As shown in FIG. 6, the offset between the upper and lower strip assemblies and the resulting use of the tabs 26 and 28 is reduced to permit the same size strips as in the prior art device to be employed while positioning the mouth of the sheath near the inside edge of the bonded area of the upper strip assembly. Of course by employing larger strips the tab size may be maintained the same.

Figure 9:
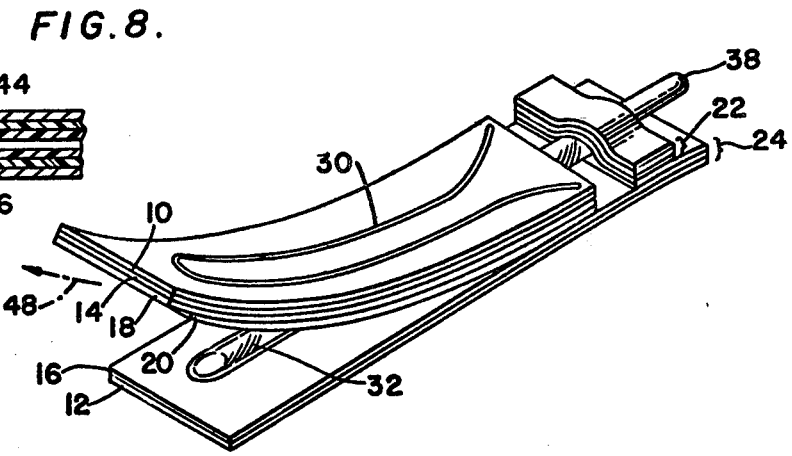
FIG. 9 is a perspective view of the inventive sheath-package with the thermometer inserted therein, showing in particular the upper excess material being pealed back and separated from the tab along the weakened portion.

As shown in FIG. 9, the upper cover material and the upper and lower excess portions of sheath material are pealed back similar to the way described in conjunction with FIGS. 4 and 5. However, once this material is pealed back a short distance a sharp tug in the direction shown by the arrow 48 will result in clean severance of those portions from the tab 26 because of the weakened portion 44. Although the thermoplastic material is not weakened it will also provide a clean break because of the narrow width of the thermoplastic material between the ends of the mouth 36 and the edges of sheath-package. Thus the edge of the mouth must be near enough to the edges of the strips to permit the clean break to occur with a quick or sharp tug.

Thus, there is provided a sheath-package in which the cover layers and excess sheath material can easily be stripped away from the sheath and separated from a holding tab to expose the sheath after a thermometer has been inserted therein. In this manner, all of the excess material used to form a protective covering for the sheath can be removed easily and quickly without risking contamination of the sheath during the removal of the protective material. The embodiment of the inventive sheath-package described above is intended to be merely exemplary and those skilled in the art will be able to make modifications and variations to it without departing from the spirit and scope of the claims appended hereto.

I claim:
1. A sheath-package comprising:
two inner sheets disposed adjacent to each other and adapted to be sealed to each other, the outer surfaces of said inner sheets being sterilizable,
two cover sheets, each of which is disposed adjacent to the outer surface of one of the inner sheets, the inner surface of each cover sheet being sterilizable and adapted to be sealed to its respective adjacent inner sheet,
a sheath formed by joining the inner sheets together along a seal line in the form of a tear seal, the portions of the inner sheets outside of the tear seal forming waste portions, the seal line terminating at two end points to define a mouth adapted for insertion of an instrument into the sheath,
said two end points being spaced from the ends of both of said inner sheets and both of said cover sheets to form a tab from the portions of the inner and outer sheets projecting beyond the mouth,
the respective adjacent inner and cover sheets being sealed together at least along the seal line and between the two end points of the seal line;
said cover sheets each including a weakened portion across substantially the entire width thereof near the mouth so that the cover sheet can easily be separated along the weakened portion.

2. The sheath-package in claim 1, wherein the inner sheets are formed of a heat sealable material.

3. The sheath-package in claim 1, wherein the cover sheets each include a sealable coating on the inner surface thereof.

4. The sheath-package in claim 3, wherein the coating is heat sealable.

5. The sheath-package in claim 1, wherein the weakened portion is in the area where the respective adjacent inner and cover sheets are sealed together between the two end points of the seal line.

6. The sheath-package in claim 5, wherein the weakened portion includes a series of perforations across said one of the cover sheets.

7. The sheath-package in claim 5, wherein the weakened portion includes a score line across said one of the cover sheets.

8. The sheath-package in claim 1, wherein the weakened portion is outside of the area where the respective adjacent inner and cover sheets are sealed together between the end points of the seal line.

9. The sheath-package in claim 8, wherein the weakened portion includes a score line across said one of the cover sheets.

10. The sheath-package in claim 8, wherein said cover sheets includes a sealable coating on the inner surface thereof.

11. The sheath-package in claim 10, wherein the weakened portion includes a series of perforations across said cover sheets, the perforations not penetrating through the sealable coating.

12. The sheath-package in claim 10, wherein the weakened portion includes a score line across said cover sheets.

13. A sheath-package as recited in claim 1, wherein said end points of said seal line defining said mouth are spaced from and sufficiently near to the edges of said inner sheets so that said waste portions will sever from the portions of said inner sheets in said tab at said mouth in response to a sharp tug applied to said waste portions after said waste portions have been separated from said sheath along said seal line.

* * * * *